(12) United States Patent
Mattila

(10) Patent No.: US 10,233,025 B2
(45) Date of Patent: Mar. 19, 2019

(54) IDLER WHEEL FRAME WITH FRAME ADJUSTMENT MECHANISM

(71) Applicant: Transco Industries, Inc., Portland, OR (US)

(72) Inventor: Greg Mattila, Scappoose, OR (US)

(73) Assignee: Transco Industries, Inc., Portland, OR (US)

( * ) Notice: Subject to any disclaimer, the term of this patent is extended or adjusted under 35 U.S.C. 154(b) by 0 days.

(21) Appl. No.: 15/471,995

(22) Filed: Mar. 28, 2017

(65) Prior Publication Data

US 2017/0305680 A1 Oct. 26, 2017

Related U.S. Application Data

(60) Provisional application No. 62/325,886, filed on Apr. 21, 2016, provisional application No. 62/460,600, filed on Feb. 17, 2017.

(51) Int. Cl.
*B65G 21/10* (2006.01)

(52) U.S. Cl.
CPC .................................. *B65G 21/10* (2013.01)

(58) Field of Classification Search
CPC ...................................................... B65G 39/16
USPC ....................... 211/169; 198/806, 807, 810.3
See application file for complete search history.

(56) References Cited

U.S. PATENT DOCUMENTS

| 2,179,047 A | 11/1939 | McMurry |
| 3,002,606 A | 10/1961 | Lo Presti |
| 3,058,574 A | 10/1962 | Gianukos |
| 3,089,580 A | 5/1963 | Dilgard |
| 3,240,321 A | 3/1966 | Lo Presti et al. |
| 3,246,736 A | 4/1966 | Lo Presti |

(Continued)

FOREIGN PATENT DOCUMENTS

| CN | 103129909 A | 6/2013 |
| GB | 2207408 A | 2/1989 |
| WO | WO 02/22474 A1 | 3/2002 |

OTHER PUBLICATIONS

Office action dated May 22, 2018, issued by the Canadian Intellectual Property Office in Canadian Patent Application No. 2,964,984, filed Apr. 20, 2017.

(Continued)

*Primary Examiner* — Gene O Crawford
*Assistant Examiner* — Lester III Rushin
(74) *Attorney, Agent, or Firm* — Klarquist Sparkman, LLP

(57) ABSTRACT

An idler wheel support for a conveyor belt comprises a gear rack adjustment mechanism or for use in adjusting the position of one end portion an idler wheel supporting frame. The gear rack is provided at said one end portion of the frame, such as on a foot, or on a base to which the foot is slidably coupled. A tool comprising a gear is selectively positioned for pivoting on the foot or base that does not have the gear rack with the gear engaged with the gear rack. When so engaged, pivoting the gear shifts said one end portion of the frame and adjusts the angle of the frame relative to the longitudinal conveyor frame axis and adjusts the longitudinal tracking of the conveyor belt. The gear can be mounted on a lever and positioned for pivotal engagement with the gear rack to enable adjustment of the belt tracking while the belt is moving.

30 Claims, 7 Drawing Sheets

(56) References Cited

U.S. PATENT DOCUMENTS

| | | | |
|---|---|---|---|
| 4,996,563 A * | 2/1991 | Blanding | G03G 15/754 198/806 |
| 6,550,606 B2 | 4/2003 | Tapp | |
| 7,331,210 B2 | 2/2008 | Dietrich | |
| 7,500,553 B2 * | 3/2009 | McGarrigle | B65G 23/44 198/813 |
| 7,971,705 B2 | 7/2011 | Jabber et al. | |

OTHER PUBLICATIONS

Machine translations of CN 103129909 A from Lexis/Nexis/Total Patent and Espacenet/Patent Translate.

* cited by examiner

IDLER WHEEL FRAME WITH FRAME ADJUSTMENT MECHANISM

CROSS REFERENCE TO RELATED APPLICATION

This application claims the benefit of U.S. Provisional Application Ser. No. 62/460,600, entitled IDLER WHEEL FRAME WITH FRAME ADJUSTMENT MECHANISM, filed on Feb. 17, 2017, and also claims the benefit of U.S. Provisional Application Ser. No. 62/325,886, entitled IDLER WHEEL FRAME WITH FRAME ADJUSTMENT MECHANISM, filed on Apr. 21, 2016, both of which applications are incorporated by reference herein.

FIELD

This disclosure relates to conveyor belt idler wheel supporting structures.

BACKGROUND

Conveyor belts are typically supported by support assemblies comprising rollers carried by a support structure. These support assemblies are positioned at spaced apart locations along the length of the belt.

FIG. 1 shows a conventional prior art idler wheel conveyor belt support assembly with an idler wheel frame 10 having a cross frame member 12 that is an inverted angle iron in this example. Brackets or feet 11, 13 at the respective opposed ends of the cross frame member 12 are used to secure the frame (e.g. using idler support mounting bolts) to a supporting rail or other conveyor frame supporting structure. In this example, bracket 11 has bolt receiving slots at the opposite ends of the bracket for receiving bolts to secure the bracket 11 to a conveyor frame portion 15. This example, also shows bracket 13 with bolt receiving slots at the opposite ends of the bracket for receiving bolts to secure the bracket 13 to a conveyor frame portion 17. The frame includes idler wheel or roller brackets, such as indicated at 16, 18 and 19 for supporting respective wheels or rollers 20, 22, 24. These wheels or rollers support a conveyer belt 26 for movement in direction 27 aligned with the longitudinal axis of a conveyor frame that supports the conveyor belt.

To adjust the position of the FIG. 1 idler wheel support assembly, typically one pounds on the upright idler wheel support (e.g. on support 16) and the frame at one end of the support with a hammer to angle the support (relative to the long axis of the conveyor) for belt tracking adjustment.

Increasingly, for safety reasons, companies will not allow this work to take place without first stopping the conveyor belt from moving and locking out the conveyor belt against further movement. If not stopped, a moving belt presents hazards to workers due to proximity of hammers used to pound on the frame and the moving conveyor belt. Stopping the belt movement during such adjustments results in inefficiencies. For example, this approach eliminates real-time feedback of the effect of any tracking adjustment. Until movement of the conveyor belt is restarted, one does not know if the pounding on the frame moved the end of the frame too much or not enough to solve tracking issues with the conveyor belt. Consequently, the starting and stopping of the belt may need to be repeated a number of times until the adjustments produce the desired result. This can result in excessive downtime of a conveyor, which is expensive, especially in the case of large conveyors that move large quantities of materials such as coal, ore, agriculture products and other items.

Therefore a need exists for an improved adjustable idler wheel supporting structure.

SUMMARY

In accordance with this disclosure, an idler wheel assembly includes an adjustment mechanism or structure for use in adjusting the position of an idler wheel supporting frame, and thereby the position of idler wheels supported by the idler wheel supporting frame, relative to a conveyor frame carrying the idler wheel assembly. The adjustment mechanism is accessible from locations spaced from the belt, such as by using an adjustment tool comprising a lever. This allows a worker adjusting the positioning of the idler wheel supporting frame to make such belt tracking adjustments from a location spaced away from a conveyor belt. As a result, such adjustments can be made, if desired, while the conveyor belt is moving so that the worker receives real time feedback by the moving belt of the effect of the adjustment and conveyor belt movement downtime is minimized.

The idler wheel supporting frame is desirably supported for sliding movement of one end thereof in a direction parallel to, or substantially parallel to, the longitudinal axis (length dimension direction) of a conveyor frame and relative to the conveyor frame. The longitudinal axis of the conveyor frame that extends in the direction of motion of the conveyor belt.

In one form, one end portion of the idler wheel supporting frame is slidably coupled to a base or mount for movement relative to the base. The base can be a portion of a conveyor frame, but more desirably is a separate member, such as comprising a mounting plate mounted to a conveyor frame or other conveyor support.

A gear rack can be coupled to one of the idler wheel supporting frame or to the base. The other one of the idler wheel supporting frame or mount that is not coupled to the gear rack can have a gear engagement pivot structure about which the gear axis is pivoted with the gear teeth engaged with the gear rack. One such gear engagement pivot structure is an aperture for receiving and engaging a pivot projection that projects from the gear. Alternatively, the gear engagement pivot structure can comprise a pivot projection that is inserted into a pivot receiving opening provided in the gear. The aperture or pivot are positioned such that, with the gear positioned for pivoting about the gear engagement pivot structure, the gear teeth engage the gear rack. When engaged in this manner, pivoting of lever about the gear axis the gear and shifts the position of the end portion of the idler wheel supporting frame and supported idler wheels relative to the base and thereby relative to the conveyor belt.

A lever with a long handle and an adjustment mechanism engagement structure, such as a lever eighteen inches to two feet long or longer, comprises one form of a tool for use in adjusting the position of the end portion of the idler wheel supporting frame. The engagement structure can comprise a gear mounted to one end portion thereof. The gear can comprise upper and lower surfaces with gear teeth positioned about at least a portion of the circumference of the gear and about a central pivot axis of the gear. The gear teeth can extend between the upper and lower surfaces of the gear. The upper surface of the gear can be mounted to the lever and a projection, such as a pin, can project outwardly from the lower surface of the gear with an axis of the projection aligned with the gear axis. Alternatively, the gear can otherwise be pivotal about the gear axis, such as receiving a projection that defines an axis about which the gear can rotate.

In one specific embodiment, a bracket or foot at one end portion of an idler wheel support frame comprises a gear rack that is exposed at of one end portion of an idler wheel support frame member and a gear engaging aperture is provided in the base at a location spaced from the gear rack. In another specific embodiment, the gear rack is provided on the base adjacent to one end portion of the frame and a gear engaging aperture is provided on the base at such frame end portion.

In accordance with one aspect, an idler wheel support is disclosed for coupling to a conveyor frame and for supporting idler wheels that carry a conveyor belt. The conveyor belt has first and second sides and a conveyor belt longitudinal axis oriented in the direction of movement of the conveyor belt. In addition, the conveyor frame has a longitudinal axis substantially aligned with the conveyor belt longitudinal axis. In one embodiment, the idler wheel support comprises: a frame member comprising a body with first and second end portions, the frame member having a frame member longitudinal axis that is oriented transverse to the longitudinal axis of the conveyor frame when the idler wheel support is in position on the conveyor frame to support the conveyor on the idler wheels; idler wheel support brackets extending upwardly from the frame member in a position to mount idler wheels that carry the conveyor belt; a first foot, such as a bracket, coupled to the first end portion of the frame member for coupling the first end portion of the frame member to the conveyor frame at the first side of the conveyor belt; a second foot, such as a bracket, coupled to the second end portion of the frame member for coupling the second end portion of the frame member to the conveyor frame at a second side of the conveyor belt, the second foot being coupled to the conveyor frame so as to pivot relative to the conveyor frame to allow changes in the angle of the frame member longitudinal axis relative to the conveyor frame longitudinal axis when the first foot and the second foot are coupled to the conveyor frame upon movement of the first foot and first end portion of the frame member coupled to the first foot; a base for coupling to the conveyor frame; the first foot being slidably coupled to the base, wherein sliding movement of the first foot relative to the base changes the angle of the frame member longitudinal axis relative to the conveyor frame longitudinal axis; one of the first foot and the base comprising a gear rack, the other of the first foot and the base other than said first foot and the base comprising a gear coupler positioned adjacent to the gear rack; and wherein positioning a gear in the gear coupler and in engagement with the gear rack and pivoting the gear relative to the gear coupler in a first gear pivot direction slides the first foot and first end portion of the frame member in a first direction and pivots the second end portion of the frame member in the first direction, and pivoting the gear relative to the gear coupler in a second gear pivot direction opposite to the first gear pivot direction slides the first foot and first end portion of the frame member in a second direction opposite to the first direction and pivots the second end portion of the frame member in the second direction, whereby sliding the first end portion adjusts the frame member longitudinal axis relative to the conveyor frame longitudinal axis and adjusts the longitudinal tracking of the conveyor belt.

In accordance with other aspects of embodiments, the gear rack can be on the first foot. In addition, the first foot can comprise a plate, which can be part of a bracket welded or otherwise mounted to the first end portion of the frame member. The plate can have an exposed side edge and the gear rack can be machined into or otherwise formed in the exposed side edge. The plate can also comprise a second side edge opposite to the exposed side edge and the base can comprise at least one upright flange positioned to abut the second side edge of the plate and guide the sliding movement of first foot.

Alternatively, the gear rack can be carried by or on the base in a position facing the first end portion of the frame member.

In accordance with still further features of embodiments, a gear coupler is provided for pivotally engaging a gear so that the gear can pivot about a gear axis with the gear engaged with the gear rack. The gear coupler can comprises an aperture comprising an upright aperture axis, the aperture pivotally receiving the gear, such as with a projection or pin from the gear inserted in the aperture; whereby the gear pivots about the aperture axis and gear pivot axis in respective first and second gear pivot directions to slide the first end portion of the frame member in respective first and second directions to thereby adjust the tracking of the conveyor. Alternatively, the gear coupler can comprise a pivot or pin with a pivot axis and that is received in an opening of the gear with the gear axis aligned with the pivot axis.

As still further aspects of embodiments, the first foot can comprise a mounting bracket having a first foot first end portion extending in one direction away from a body of a frame member and a first foot second end portion extending in another direction opposite to said one direction and away from the frame member body and away from the first foot first end portion. The first foot first end portion can comprise a first bolt receiving slot and the first foot second end portion can comprise a second bolt receiving slot. The first and second bolt receiving slots can extend in opposite directions away from the frame member for receiving respective bolts that hold the first foot in position on a portion of the conveyor frame, but permit the sliding movement of the first foot relative to the conveyor frame in response to pivoting the gear in the respective first and second gear pivot directions when the gear is in engagement with the gear rack. The first and second bolt receiving slots can have a length that permits sliding of the first foot at least a total of two and one-half inches in response to pivoting the gear in the first and second gear pivot directions.

In accordance with additional aspects of embodiments, the base that slidably receives the first foot can comprises first and second base end portions. A base bolt receiving aperture or hole can be provided through the first base end portion that is aligned with one of the first and second bolt receiving slots in the first foot. The base bolt receiving aperture is desirably sized such that a bolt inserted through the aligned first or second bolt receiving slot and the base bolt receiving aperture couples the base to the conveyor frame, and wherein the base aperture is desirably sized to receive the base bolt and prevent sliding movement of the base relative to the conveyor frame. Also, the second base end portion can comprise a base slot aligned with another of the first and second bolt receiving slots other than said one of the bolt receiving slots that is aligned with the aperture through the base. The base slot and said another of the first and second fastener receiving slots permitting sliding of the first foot relative to the base in response to pivoting the gear in engagement with the gear rack in the respective first and second gear pivot directions.

In accordance with additional aspects of embodiments, a second foot, such as a mounting bracket, couples the second end portion of the idler support frame member to the conveyor frame. The second foot is coupled to the conveyor frame so as to pivot and allow the sliding movement of first end portion of the frame member to adjust the angle of the frame member relative to the longitudinal axis of the conveyor frame. The second foot can comprise a second foot first end portion extending in one direction away from the body and a second foot second end portion extending in another direction opposite to said one direction and away from the body and away from the second foot first end portion. The second foot first end portion can comprise a third bolt receiving slot and the second foot second end portion can comprise a fourth bolt receiving slot. The third and fourth bolt receiving slots can extend in opposite directions away from the frame member for receiving respective bolts that hold the second foot in position on the conveyor frame. The width of the third and fourth slots can be greater than the diameter of the bolts to be received therein to provide clearance between such bolts and the slots of the second foot so as to permit the pivoting movement of the second foot relative to the conveyor frame, albeit not about a fixed pivot, and to thereby allow changes in the angle of the frame member longitudinal axis relative to the conveyor frame longitudinal axis when the first foot and the second foot are coupled to the conveyor frame and in response to pivoting the gear in engagement with the gear rack in the respective first and second gear pivot directions. Alternatively, the second end portion can be pivotally coupled to the conveyor frame by a fixed pivot, such as by a single bolt or pivot pin coupled to the conveyor frame. The second foot at the second end portion of the frame member in this example is thereby pivotally coupled by a fixed pivot to permit the pivoting movement of the second foot as the first foot is slid in respective first and second directions.

In accordance with an embodiment, an idler wheel support for supporting idler wheels that carry a conveyor belt can comprise: a frame member having a body with first and second frame end portions; a plurality of idler wheel supports projecting from the frame member; a first foot coupled to the first frame end portion; a second foot coupled to the second frame end portion; a base for positioning beneath the first foot; the first foot being slidable in respective opposed first and second directions relative to the base; and one of the first foot and the base comprising a gear rack, the other of the first foot and the base other than said first foot and the base comprising a gear coupler positioned adjacent to the gear rack. In this embodiment, positioning a gear in the gear coupler and in engagement with the gear rack and pivoting the gear relative to the gear coupler in a first gear pivot direction with the gear engaged in the gear rack slides the first foot and first end portion of the frame member relative to the base and relative to the conveyor frame in the first direction. In addition, pivoting the gear relative to the gear coupler in a second gear pivot direction opposite to the first gear pivot direction with the gear engaged with the gear rack slides the first foot and first end portion of the frame member in the second direction relative to the base and relative to the conveyor frame. This movement adjusts the angle of the idler wheel support frame and idler wheels relative to the longitudinal axis of the conveyor frame to thereby adjust the tracking of the conveyor belt.

In accordance with yet another embodiment, an idler wheel support for supporting idler wheels that carry a conveyor belt comprises: a frame member having a body with first and second frame end portions; a plurality of idler wheel supports projecting from the frame member; a first foot coupled to the first frame end portion; a second foot coupled to the second frame end portion; a base for positioning beneath the first foot; the first foot being slidable in respective opposed first and second directions relative to the base and the first end portion of the frame member sliding relative to the base with the sliding movement of the first foot; one of the first foot and the base comprising a gear rack, the other of the first foot and the base other than said first foot and the base comprising a gear coupler positioned adjacent to the gear rack; and wherein the gear coupler comprises an aperture comprising an upright aperture axis, the aperture being positioned relative to the gear rack such that the aperture pivotally receives a gear with the gear engaged with the gear rack, and wherein pivoting the received gear about the aperture axis in the respective first and second gear pivot directions with the received gear in engagement with the gear rack operates to slide the first foot in the respective first and second directions and relative to the base and conveyor frame.

The embodiments include the various aspects alone and in all combinations and sub-combinations with one another, except that inconsistent alternative structures would not be found in the same embodiment. The disclosure also includes methods implemented by the embodiments.

The foregoing and other objects, features, and advantages of the invention will become more apparent from the following detailed description, which proceeds with reference to the accompanying figures.

DETAILED DESCRIPTION

Figure 1:
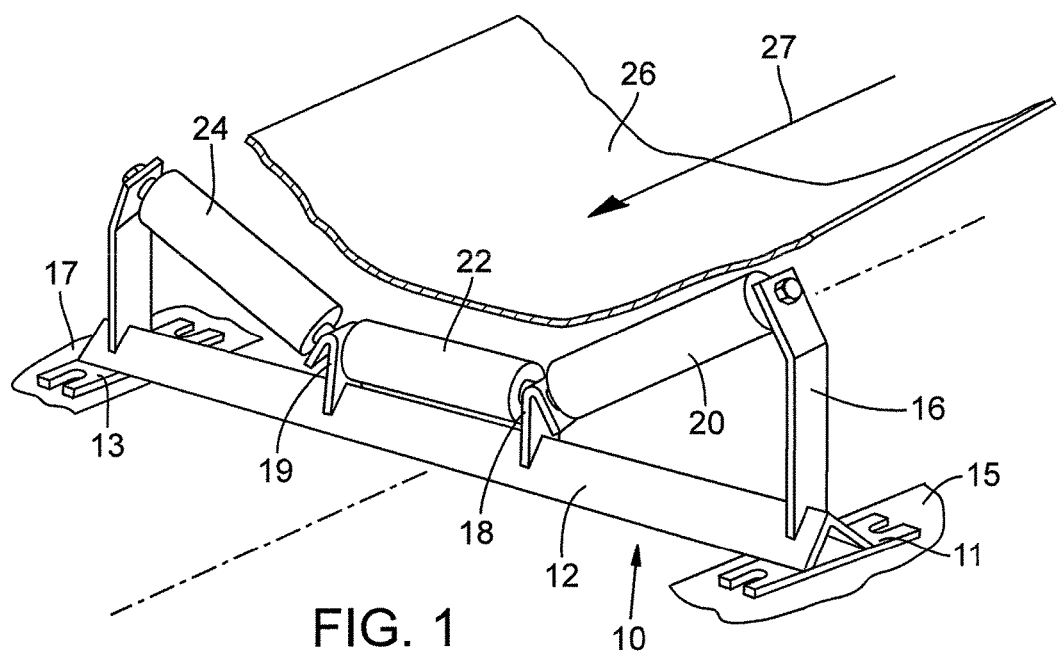
FIG. 1 shows a conventional prior art idler wheel conveyor belt supporting structure.

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the terms "includes" and "has" have the same meaning as "comprises". Also, the terms "including" and "having" have the same meaning as "comprising". In addition, the terms include and have are mean comprise. Numerical values set forth in this disclosure and in the drawings are exemplary except to the extent included in any claims that specifically recite such values. The term gear refers to an element having a plurality of gear teeth, but the gear teeth do not have to be present around the entire circumference of the gear element. If a given value is expressed, it is to be understood that variations due to machining tolerances are also meet the value. The term substantially equal to a value means a variation of plus or minus zero to three percent of the value. The term approximately equal to a value means a variation of plus or minus ten percent from the value.

Figure 7:
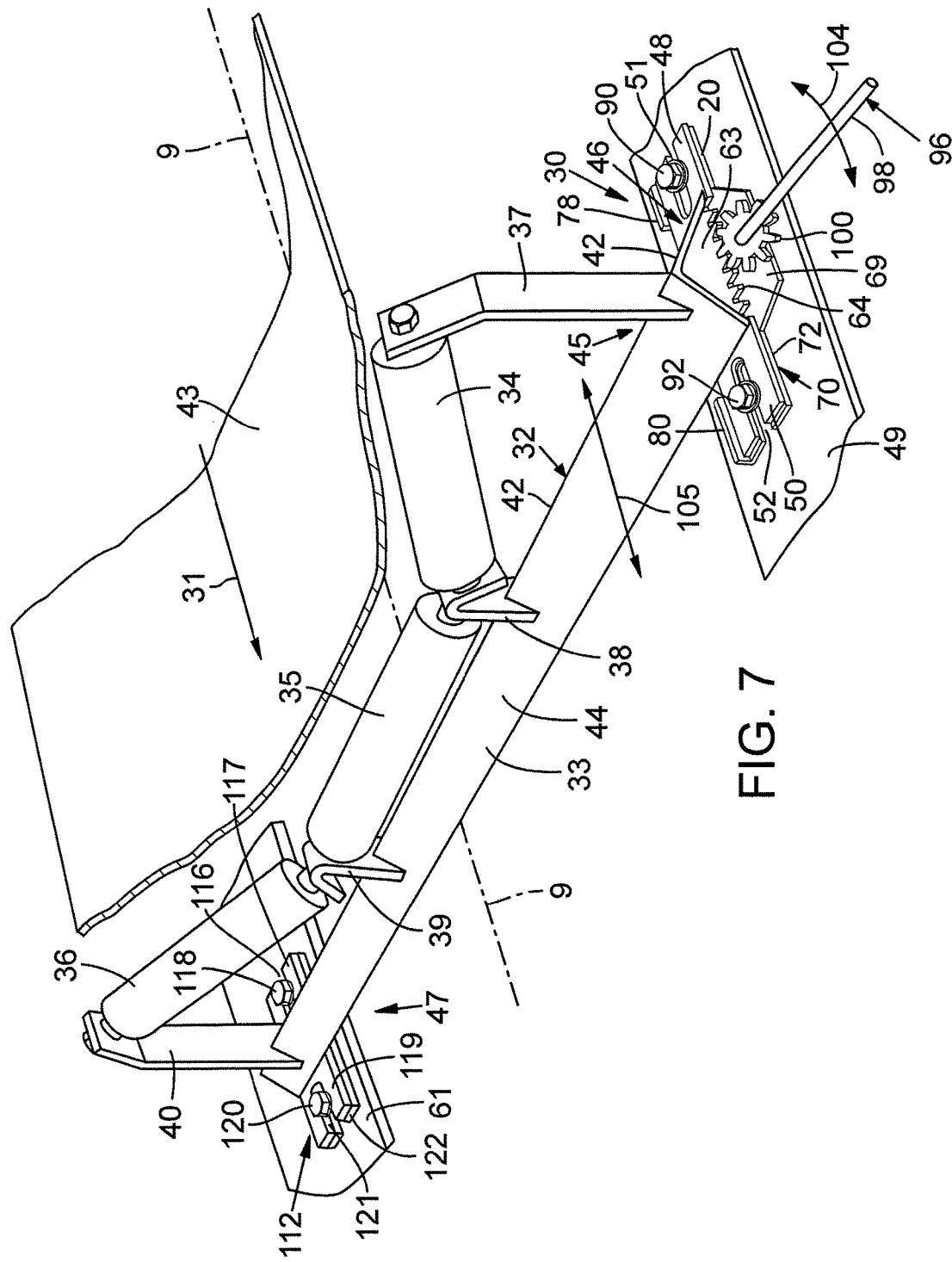
FIG. 7 is a perspective view of one embodiment of an entire idler wheel support assembly including supported idler wheels such as rollers, an idler wheel supporting frame and respective feet, such as mounting brackets, at opposite ends of the frame and with an embodiment of a tracking adjustment mechanism at one end portion thereof.

With reference to FIG. 7, in accordance with an embodiment of this disclosure, an idler wheel assembly 25 (FIG. 7) includes an adjustment mechanism or structure, such as indicated at 30, for use in adjusting the position of one end portion 31 of an idler wheel supporting frame 32. The frame 32 comprises a frame member 33 with a frame body. The idler wheel supporting frame 32 carries idler wheels 34, 35 and 36 supported by upright idler wheel supporting brackets 37, 38, 39 and 40 that extend upwardly from the frame member 33. More specifically, the frame member 33 extends transversely beneath a conveyor belt 43 carried by the idler wheels. The frame member has first and second end portions 45, 47 and a longitudinal axis extending transversely to the longitudinal axis or direction of movement of the conveyor belt. The illustrated first end portion 45 and second end portion 47 can, and desirably do, extend outwardly beyond respective first and second sides of the conveyor belt 43.

In operation, the adjustment mechanism 30 shifts the position of the first end portion 45 of the frame member relative to the conveyor frame and thereby relative to the conveyor belt. This adjusts the longitudinal axis of the frame member 33 relative to the longitudinal axis of the conveyor frame (indicated at 9 in FIG. 7) and conveyor belt 43. As a result, the tracking of the direction of motion 31 of the conveyor belt over the idler wheels is changed, such as to be more centered on the idler wheels. The adjustment mechanism 30 is accessible from locations spaced from the belt, such as by using an adjustment tool comprising a lever, such that a worker adjusting the idler wheel supporting frame using the adjustment mechanism 30 can do so from a location spaced away from the moving conveyor belt. As a result, such tracking adjustments can be made, if desired, while the conveyor belt is moving so that real time feedback of the effect of a tracking adjustment is provided and conveyor belt downtime is minimized.

The idler wheel supporting frame 32 is desirably supported by conveyor frame components, such as conveyor frame portion 49 supporting first frame end portion 45 and conveyor frame portion 61 supporting second frame end portion 47. The conveyor frame has a longitudinal axis indicated at 9 in FIG. 7. Typically a conveyor belt has a return loop carried by a lower portion of the conveyor frame (not shown). Idler wheel support assemblies such as described herein can also be used to support the return loop portion of the conveyor belt. End portion 45 of frame member 32 is supported by an adjustment mechanism 30 for movement in a direction desirably parallel to, or substantially parallel to, or approximately parallel to, the longitudinal axis (length dimension direction) of the conveyor frame. The adjustment mechanism is operated to slide end portion 45 relative to the conveyor frame. The second end portion 47 is pivotally coupled to conveyor frame portion 61 so as to allow this movement, as explained below.

In one form, the idler wheel supporting frame 32 has the first end portion 45 slidably coupled to the supporting frame portion 49 and more desirably slidably coupled to a base 70 coupled to or mounted directly to frame portion 49 for movement relative to the conveyor frame portion and the base. The base can be a portion of the conveyor frame. More desirably, the base can be provided as a separate base or base member such comprising a as a base plate (as described below), coupled to, or mounted to a conveyor frame portion, such as using bolts. Welding or other forms of mounting the base to the conveyor frame can be used, although less desirable. Conveyor frames typically are provided with pairs of spaced apart holes along their lengths for bolting idler wheel supports in place. To the extent such holes are available and appropriately positioned, bolting a base member to the conveyor frame takes advantage of these existing bolt receiving holes.

An adjustment mechanism 30 comprising a gear rack can be coupled to the first end portion of one of the idler wheel supporting frame or to the base. In the FIG. 7 embodiment, a gear rack 64 is shown mounted to the first end portion 45 of the frame member 33. In the illustrated example, the gear rack is shown formed in a side edge of a portion of a first foot, such as in a side edge of bracket 46, that is coupled to the frame member 33. In the FIG. 8 embodiment, the gear rack 64 is shown coupled to the base. The other of the idler wheel supporting frame or base that is not coupled to the gear rack (e.g. base 70 in the FIG. 7 embodiment and bracket 46 in the FIG. 8 embodiment) can have a gear engagement structure that is pivotally engageable by a gear when the gear is engaged with the gear rack. Pivoting the gear about the gear engagement structure with the gear engaged in the gear rack slides the first end portion 45 of the frame member 33 in respective opposed directions depending upon the direction of pivoting the gear.

In one form, as explained below, the gear engagement structure comprises an aperture positioned and sized to receive and pivotally engage a pin or projection that projects from the gear. The aperture is positioned such that, with the projection engaged in aperture, the gear teeth of the gear are positioned to engage the gear rack. In another form, not shown, the gear engagement structure comprises a pivot, such as a pin, positioned for insertion into an aperture in a gear so as to allow the gear to pivot about the pivot with gear teeth of the gear in engagement with the gear rack. When the gear and gear rack are engaged in this manner, pivoting of the gear about the axis of the pivot or of the aperture operates to pivot the gear and shift the position of the first end portion 45 of the idler wheel supporting frame 32.

Figure 2:
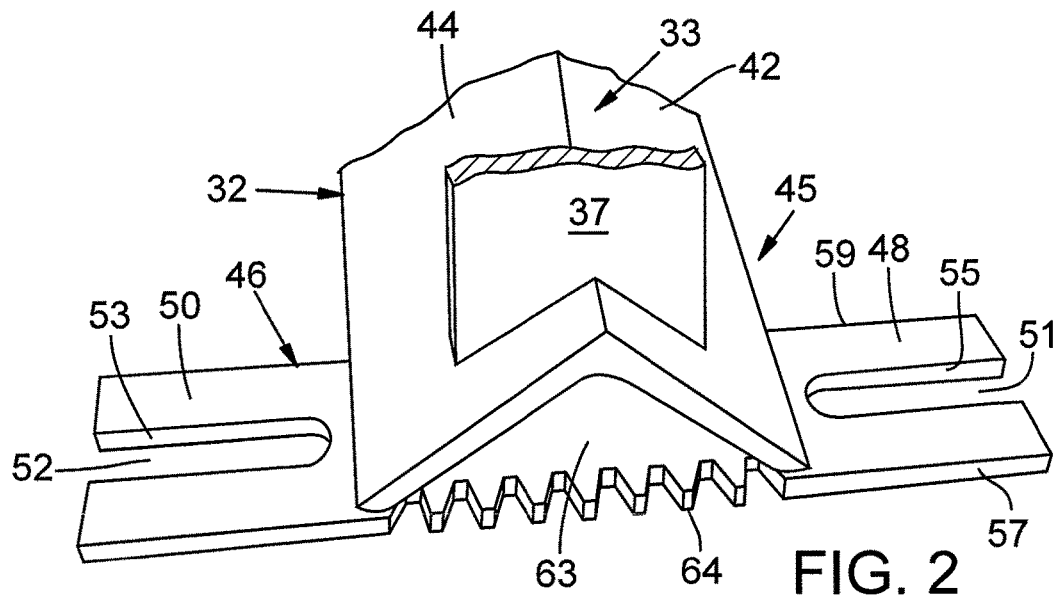
FIG. 2 shows one end portion of an embodiment of an idler wheel supporting frame for carrying a conveyor belt in accordance with this disclosure.

With reference to FIGS. 2-6, the illustrated embodiment of an idler wheel or roller supporting frame 32 comprises a frame member 33. The frame member 33 can be of any suitable shape, such as a channel, box, or, as shown in FIG. 2, an inverted angle iron shape having first and second legs 42, 44. The respective frame member 33 has its respective ends each supported by a respective foot, such as bracket 46 for the first end portion 45 and a bracket 112 (FIG. 7) for the second end portion 47. A plurality of rollers are supported by the frame member 33. The frame and bracket components of the idler wheel frame and base are desirably of a strong durable material, such as steel.

The bracket 46 can comprise a plate 63 with first and second bracket end portions 48, 50 and first and second side edges 57, 59. The bracket end portions 48, 50 are each provided respectively with an open ended bolt receiving slot 51, 52. Alternatively, the slots can be closed at their ends. The slots in this example are oriented to extent in a direction perpendicular to the longitudinal axis of the frame member 33. The slot 51 is bounded by a wall 55 and the slot 52 is bounded by a wall 53. These slots allow the sliding of the support bracket 46 to adjust the position of the first end portion 45 of the frame member 32 along the supporting conveyor frame. Desirably the first end portion 45 of the frame member is slidable in a direction parallel to, or substantially parallel to, the direction of travel of the supported a conveyor belt.

In the embodiment of FIG. 2 the gear rack 64 is formed, e.g. machined into, an exposed portion of the plate 63, such as along the side edge 57 of the plate 63. In this example, the gear rack is positioned between the legs 42, 44 of the frame member body 33. The side edge 57 can be extended outwardly beyond the end of frame elements 42, 44 in examples where more teeth are desired in the side edge than shown in FIG. 2, for example, to facilitate a greater distance of movement of the first end portion 45. In a specific example, there are seven teeth and eight troughs positioned between the frame member legs 42, 44. Although variable, the gear rack can have gear teeth with tips that are 0.152 inch wide and the depth that is 0.440 inch. When the gear rack is engaged by teeth of a gear coupler, that can have the same tooth size and depth as the gear rack, and for example an inner circle root diameter of 1.25 inch, pivoting of the gear engaged with a gear coupler in either gear pivot direction moves the gear rack and thereby the first end portion 45 of the frame member 32 a desired distance. With the gear engaging the center of such an exemplary gear rack, the gear rack can be slid one and one-quarter inch in each direction for a total throw or movement of two and one-half inches. The lengths of the slots 51, 52 accommodate this motion. When the gear is engaged in the center of the gear rack, fasteners such as bolts 90, 92 (FIG. 3) used to couple the bracket plate 63 to the conveyor frame are desirable centered along the lengths of the slots.

Figure 3:
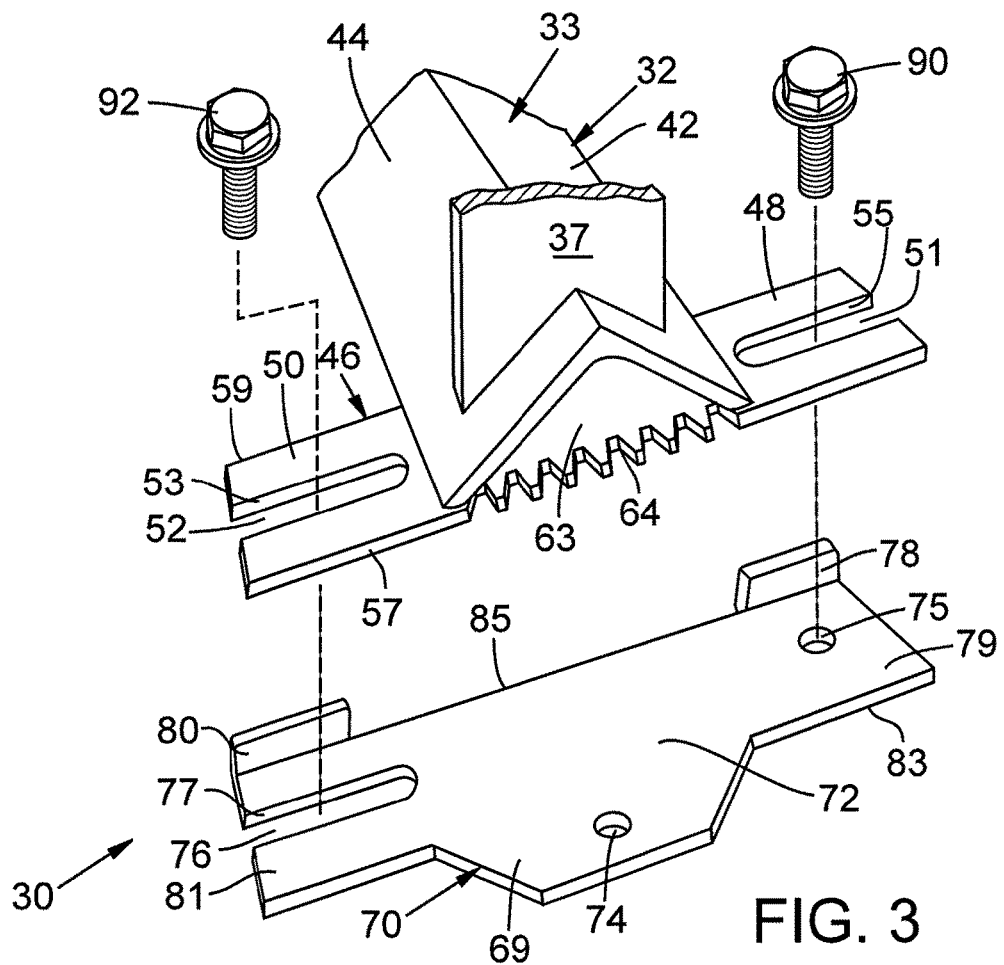
FIG. 3 is an exploded view of the embodiment of FIG. 2 and an embodiment of a base included therein.

FIG. 3 illustrates and embodiment with a frame supporting base 70 to which the bracket 46 is slidably coupled for sliding motion relative to the base. In the form shown in FIG. 3, and although the base can assume other configurations, the illustrated base comprises a plate 72. The supporting base plate 72 has a body portion with respective upper and lower planar surfaces and side edges 83, 85 and an aperture 74 through an outwardly projecting flange 69 of the base plate. The plate 72 also has an aperture 75 through one end portion 79 of the plate body. The plate body shown in this FIG. 3 also has a slot 76, which can be open or closed ended, at the end portion 81 of the plate body opposite to the end portion 79. In addition, the plate 72 can comprise at least one flange, and in this example first and second, upright flanges 78, 80, extending upwardly from the side edge 85 of the plate 70. The illustrated flanges 78, 80 are positioned on opposite sides of the frame member 33. The flanges can abut the side edge 59 of the bracket plate 53 to guide the sliding motion of the bracket plate 63. The base bolt receiving aperture 74 is sized such that a bolt 90 inserted through the aligned first or second bolt receiving slot 51, or 53 (and in FIG. 3 the slot 51) and the base bolt receiving aperture 74 couples the base 70 to the conveyor frame and prevents sliding of the base plate 72 relative to the supporting conveyor frame. A lock washer and washer (not shown) is typically positioned between the heads of bolts 90, 92 and the upper surface of bracket plate 63.

Figure 4:
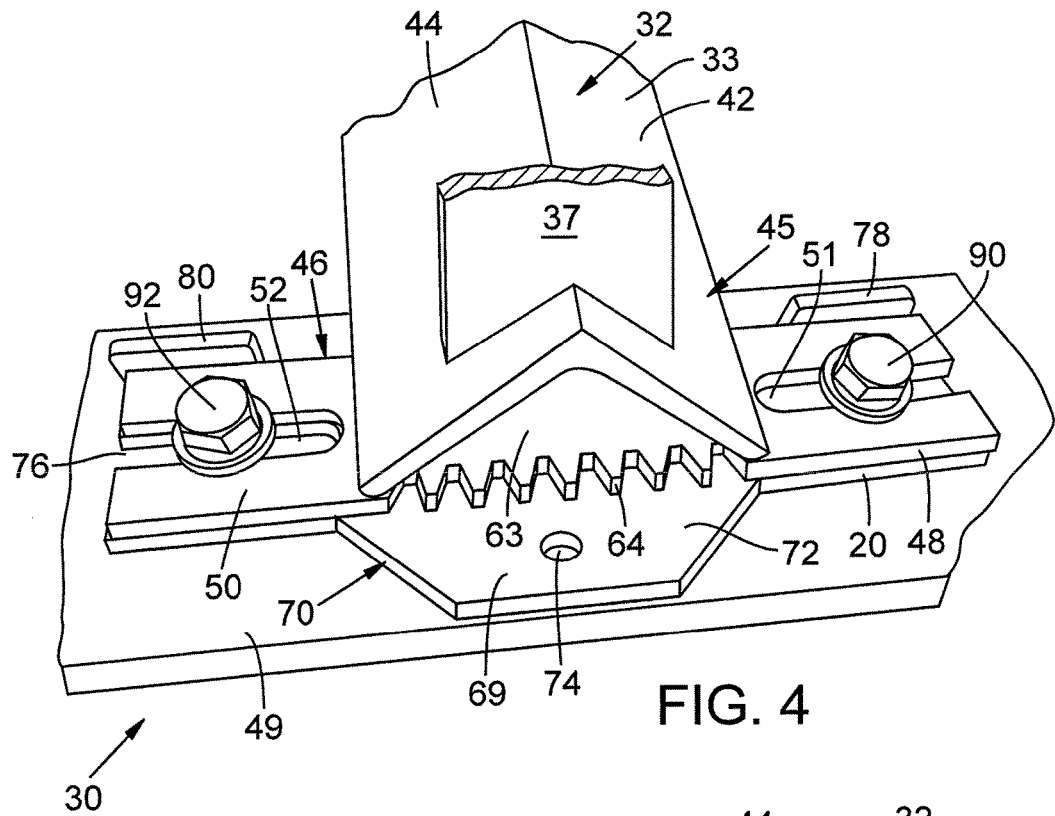
FIG. 4 shows the embodiment of FIG. 3 in an assembled state.

FIG. 4 illustrates the frame member 33 and base 70 in position with the gear rack 64 shown resting on the upper surface of the plate 72. Respective bolts 90, 92 are shown. The bolt 90 extends through the slot 51 in bracket end 48 and through the opening 74 in the mounting plate 70. The bolt 92 extends through the slot 52 at the end portion 50 of bracket 46 and also through the slot 76 of the mounting plate 70.

These bolts may be hand tightened or tightened to a specific torque. The torque is set such that the friction between the bolts and bracket 48 can be overcome using an adjustment tool, as explained below and without loosening the bolts. This adjustment results in sliding the first end portion 45 of the frame 32 in a direction parallel or substantially parallel to the conveyor frame to adjust the angular position of the frame 32 relative to the longitudinal axis of the conveyor frame to thereby adjust the position of the supported rollers and the tracking of the conveyor belt. The torque is set (e.g., 3 ft-lbs) so that the frame end portion 45 remains in place, unless moved by a gear rack engaging tool as explained below. Bolt used to couple a second foot, such as bracket 112 (FIG. 7) to the conveyor frame at the opposed end of the frame 32 can be similarly tightened so that the second end portion of the frame remains in place until the first end portion is adjusted and the second end portion pivots to allow this adjustment. Elastomeric or polymer washers or plate between the plate 72 and bracket plate 63 can be used to facilitate this desired sliding movement.

Figure 5:
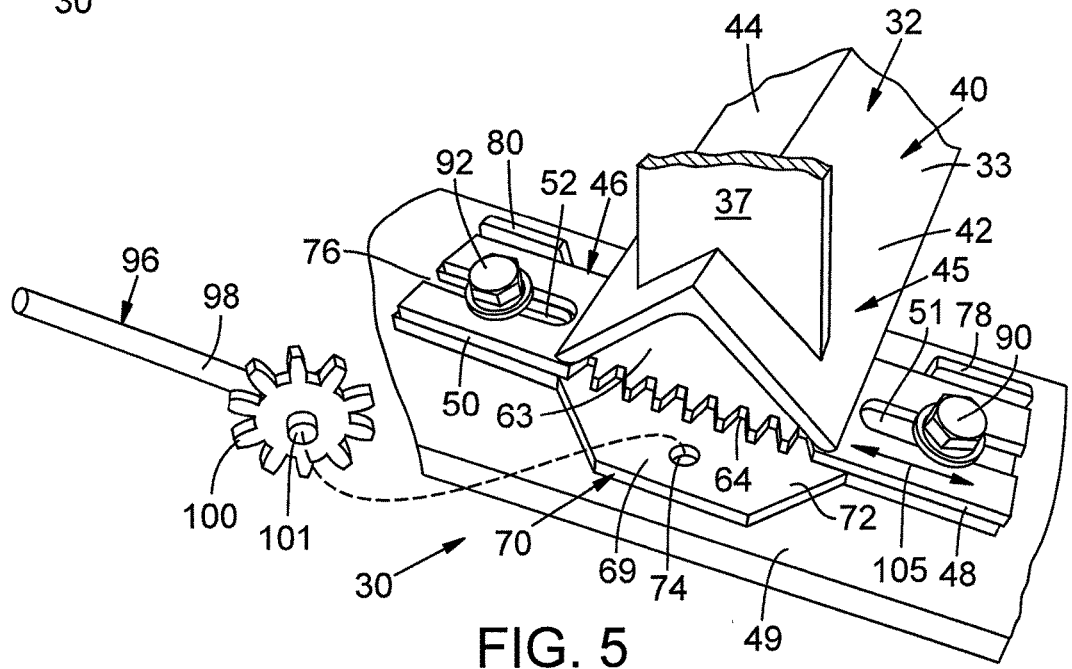
FIG. 5 is a perspective view of the embodiment of FIG. 4 together with one form of a tool for adjusting the positioning of the idler wheel supporting frame relative to a base and thereby relative to the conveyor frame and supported conveyor belt.

The tool for use in moving end portion 45 of the frame member 33 in one form is indicated at 96 in FIG. 5. The illustrated tool comprises a lever 98, such as eighteen inches to two feet long or longer, with a gear rack engager such as a gear 100 mounted to one end of the lever. The gear 100 in the embodiment of FIG. 5 has upper and lower surfaces with gear teeth positioned about the circumference of the gear. The term gear also applies to a gear with teeth only about a portion of the circumference of the gear that are sufficient to achieve the desired movement of end portion 45 of the frame member. The gear teeth are arranged about a center or central axis of the gear that extends between the upper and lower surfaces of the gear. The gear teeth of gear 100 are shaped to mesh with the teeth of the gear rack 64 when the gear engages the gear rack. The teeth of the gear 100 can have the same configuration as the teeth of the gear rack. The upper surface of the gear can be mounted to the lever. A projection, such as a pin 101, can project outwardly from the lower surface of the gear with an axis of the projection aligned with the central axis of the gear. The pin 101 is positioned for insertion into the aperture 74 with the gear teeth 101 engaged with the gear rack 64. Pivoting the gear 100 in respective opposed pivot directions slides the plate 63 in respective opposed directions indicated by double headed arrow 105 in FIG. 5.

Figure 6:
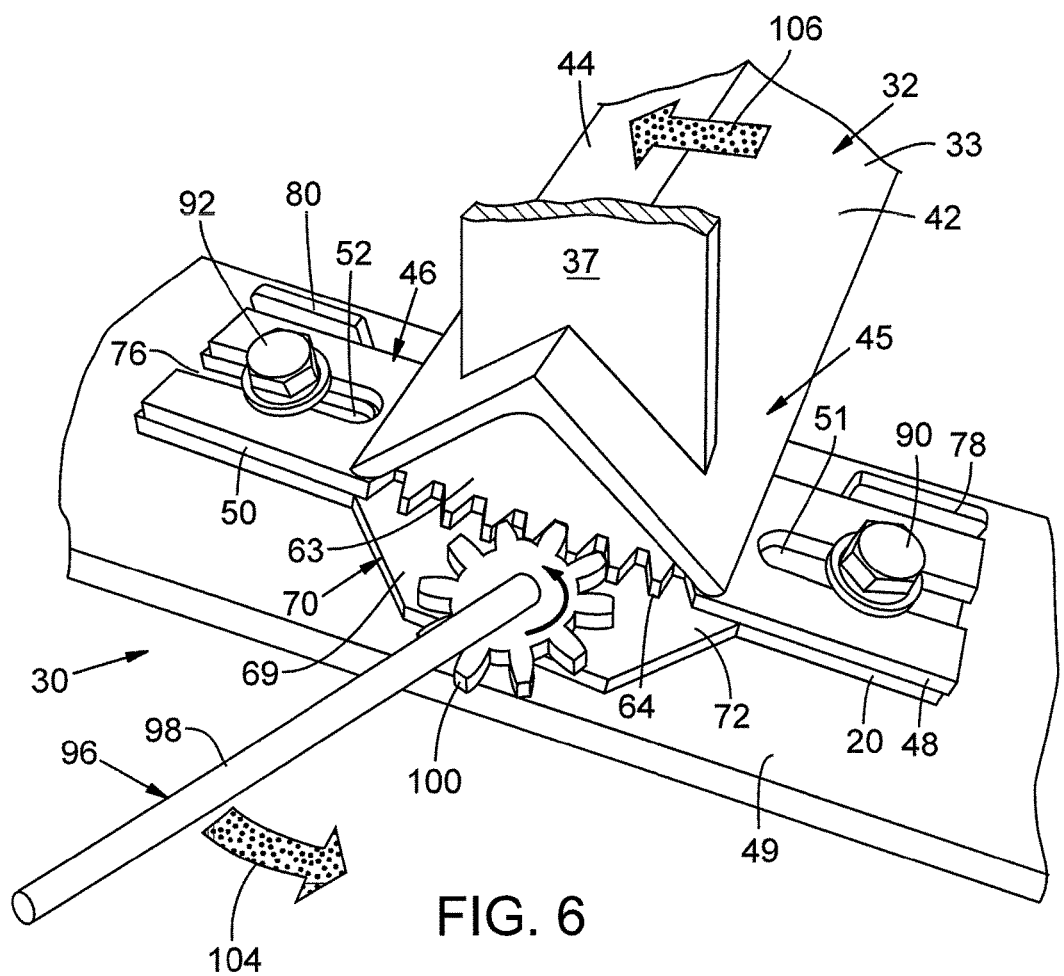
FIG. 6 is a view like that of FIG. 5, but with the illustrated tool shown in position to shift the end portion of an idler wheel supporting frame engaged by the tool relative to the base.

FIG. 6 shows the exemplary tool 96 having lever 98 and gear rack engager comprising gear 100 in engagement with gear rack 64. Pivoting the lever in a first direction 104 pivots the gear 100 in a first gear pivot direction 107 and shifts the plate 63 and the end portion 45 of the frame member 32 in the direction indicated by arrow 106 (to the left in FIG. 6). Conversely, the lever 98 can be pivoted in the opposite direction to direction 104 to pivot gear 100 in a gear pivot direction opposite to gear pivot direction 107 to shift the end portion 45 of end member 32 in a direction opposite to the direction 106 (to the right in FIG. 6).

With further reference to FIG. 7, a second foot, such as a mounting bracket 112, is provided for coupling the second end portion 47 of the frame member 32 to a portion 61 of the conveyor frame. The second foot is pivotally coupled to the conveyor frame so as to pivot relative to the conveyor frame to allow sliding movement of first end portion 45 of the frame member 32, in response to pivoting of the gear 100 in engagement with the gear rack. The second foot can comprise a second foot first end portion 117 extending in one direction away from the frame member 33 and a second foot second end portion 119 extending in another direction opposite to said one direction and away from the frame member 33 and away from the second foot first end portion 117. The second foot first end portion 117 can comprise a third bolt receiving slot 116 and the second foot second end portion 119 can comprise a fourth bolt receiving slot 121. The illustrated third and fourth bolt receiving slots 116, 121 extend in opposite directions away from the frame member 33 and are positioned for receiving respective bolts 118, 120 that hold the second foot in position on the conveyor frame portion 61 until the adjustment tool is used to slide the first end portion 45 of the frame member. The width of the third and fourth slots can be greater than the diameter of the bolts to be received therein (e.g. 11/16ths wide slots and one-half inch diameter bolts) to provide clearance between such bolts and the slots of the bracket 112 so as to permit pivoting movement of the second foot and bracket 112, and thereby the second end portion 47 of the frame 32, relative to the conveyor frame portion 61 as the first end portion 45 is slid. This pivoting movement of end portion 47 is not about a fixed pivot in this example. Alternatively, the second foot or bracket 112 can be pivotally coupled to the conveyor frame portion 61 by a fixed pivot, such as a single bolt or pivot pin coupled to the conveyor frame and to bracket 112, that permits the pivoting movement of the second foot as the first foot is slid in the respective first and second directions.

One or more shims, such as shim 122, can be provided at the second end portion of the frame member 32 so that each end of the frame member is supported at the same elevation above the conveyor frame.

Figure 8:
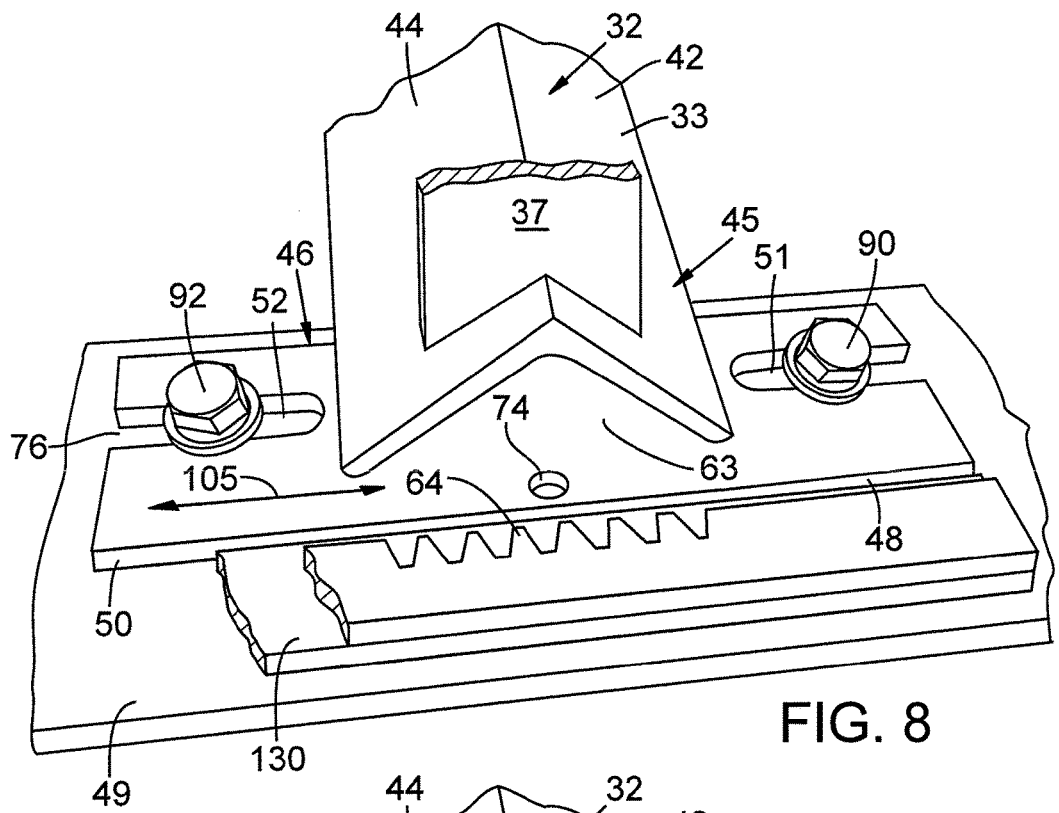
FIG. 8 is a perspective view of an alternative embodiment of an idler wheel support with an adjustment mechanism at a first end portion thereof and with a gear rack coupled to a portion of the conveyor frame.
Figure 9:
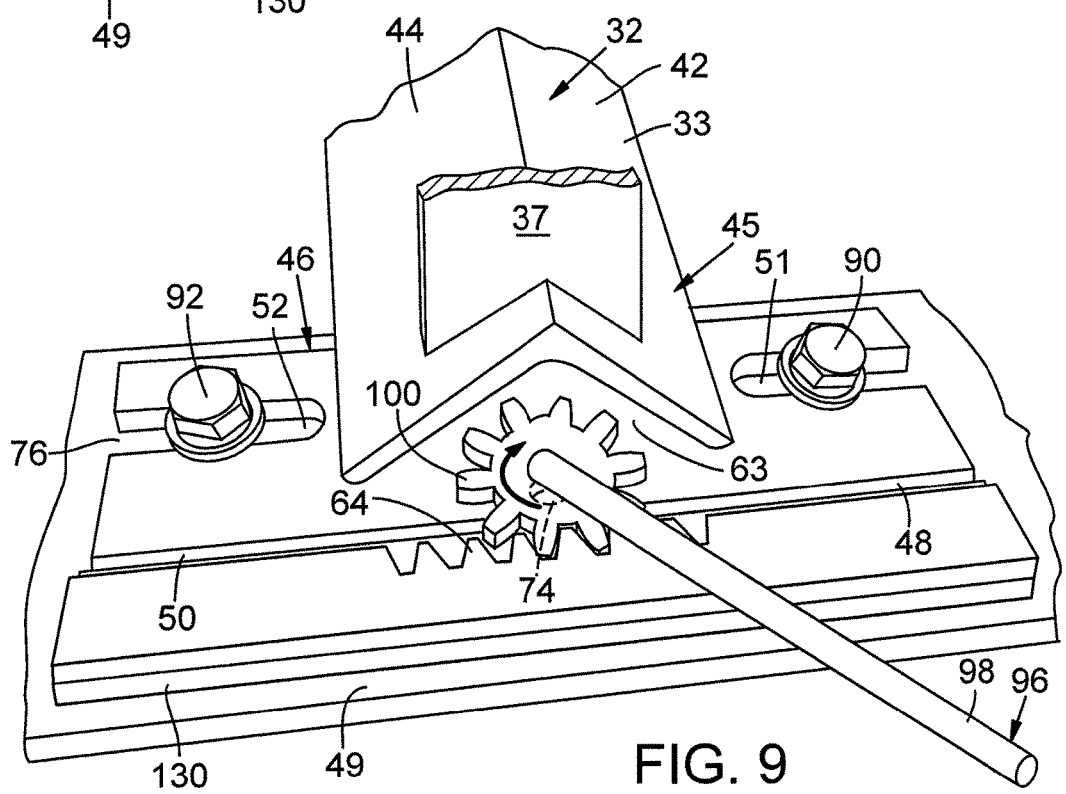
FIG. 9 is a perspective view of the embodiment of FIG. 8 with a form of adjustment tool in position to adjust the position of the first end portion of the idler wheel supporting frame relative to the longitudinal axis of a conveyor frame and relative to a conveyor belt carried by idler wheels supported by the idler wheel supporting frame.
Figure 10:
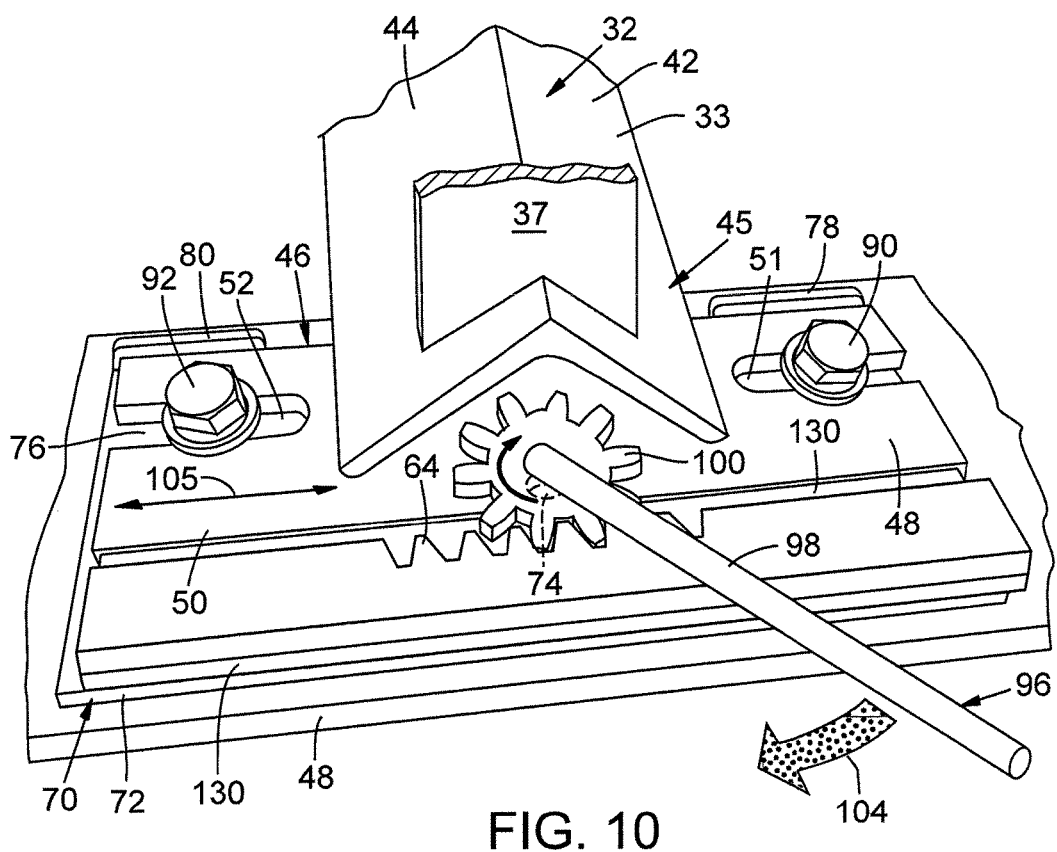
FIG. 10 is a perspective view of an embodiment like that of FIG. 8, but with a base element positioned between a portion of a conveyor frame and a foot of the idler wheel supporting frame and also between the gear rack and the conveyor frame portion.

In the embodiments of FIGS. 8-10, numbers for components corresponding to the components of the embodiments of FIGS. 2-7 have been assigned the same numbers and will not be discussed further except as useful in explaining differences in these embodiments.

In FIGS. 8 and 9, the bracket 46 is shown resting on the conveyor frame portion 49. The gear engaging aperture 74 is shown extending through plate 69 of the bracket 46. In addition, the gear rack 64 is shown coupled to the conveyor frame portion 49, as by bolts (not shown) or by welding. A spacer or shim 130 is shown in FIG. 9 positioned between conveyor frame portion 49 and gear rack 64 to position the gear rack 64 at an elevation for engaging the gear 100 of tool 96 when a pin projecting from the gear is positioned in the aperture 84. In FIG. 10, a base 70, such as the upper surface 69 of or a base plate 72 slidably supports the bracket 46 with the gear rack 64 and shim 130 carried by the base plate 72. The base plate 72 can be coupled to the conveyor frame portion 49 in the same manner as in the FIGS. 2-7 embodiments.

With the above constructions, the angular position of the end portion 45, and hence the idler wheels or rollers supported thereby, can be adjusted relative to the longitudinal axis of the conveyor frame and conveyor belt, without it being necessary for a user to place their hands near a traveling conveyor belt. Consequently, conveyor belt tracking adjustments of the positioning of the idler wheels can be made without the need to shut down the operation of the conveyor belt.

These embodiments desirably allow incremental adjustments of idler frame by pivoting a gear engaged with a gear rack using the mechanical advantage provided by a lever operated rack and pinion adjustment structure. The bolts that hold the respective ends of the idler frame in place are installed snugly. In normal operation, the frame will not move in an unwanted fashion, yet end portion 45 can still be moved as desired using the gear rack engagement tool without loosening the frame to conveyor bolts. The components can also be supplied with incremental markings or visual indicia on the side edge of bracket 46 and the gear rack to visually indicate the extent of an adjustment of the frame end portion 45; making it easier to monitor the distance the end portion 45 is slid by any adjustment as the adjustment is being made.

In a conveyor, as many idler frame supports structures of embodiments as disclosed herein as desired can be spaced along the length of the conveyor for use in adjusting conveyor belt tracking. Intermediate idler wheel supports without the adjustment features can be positioned along the conveyor between the adjustable supports. Thus, plural idler support structures as disclosed herein are typically provided along the length of a conveyor.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. An idler wheel support for coupling to a conveyor frame having a conveyor frame longitudinal axis and for supporting idler wheels that carry a conveyor belt, the conveyor belt having first and second sides and a conveyor belt longitudinal axis oriented in the direction of movement of the conveyor belt, the idler wheel support comprising:
a frame member comprising a body with first and second end portions, the frame member having a frame member longitudinal axis that is oriented transverse to the longitudinal axis of the conveyor belt when the idler wheel support is in a position to support the conveyor belt on the idler wheels;
idler wheel support brackets projecting upwardly from the frame member in a position to mount idler wheels that carry the conveyor belt;

a first foot coupled to the first end portion of the frame member for coupling the first end portion of the frame member to the conveyor frame at the first side of the conveyor belt;
a second foot coupled to the second end portion of the frame member for coupling the second end portion of the frame member to the conveyor frame at a second side of the conveyor belt, the second foot being coupled to the conveyor frame so as to pivot relative to the conveyor frame to allow changes in the angle of the frame member longitudinal axis relative to the conveyor frame longitudinal axis when the first foot and the second foot are coupled to the conveyor frame;
a base for coupling to the conveyor frame;
the first foot being slidably coupled to the base, wherein sliding movement of the first foot relative to the base changes the angle of the frame member longitudinal axis relative to the conveyor frame longitudinal axis;
one of the first foot and the base comprising a gear rack, the other of the first foot and the base other than said one of the first foot and the base comprising a gear coupler positioned adjacent to the gear rack; and
wherein positioning a gear in the gear coupler and in engagement with the gear rack and pivoting the gear relative to the gear coupler in a first gear pivot direction slides the first foot and first end portion of the frame member in a first direction and pivots the second end portion of the frame member in the first direction, and wherein pivoting the gear relative to the gear coupler in a second gear pivot direction opposite to the first gear pivot direction slides the first foot and first end portion of the frame member in a second direction opposite to the first direction and pivots the second end portion of the frame member in the second direction, whereby sliding the first end portion adjusts the frame member longitudinal axis relative to the conveyor frame longitudinal axis and adjusts the longitudinal tracking of the conveyor belt so as to be more centered on the idler wheels.

2. An idler wheel support according to claim 1 wherein the gear rack is on the first foot.

3. An idler wheel support according to claim 2 wherein the first foot comprises a plate with an exposed side edge, the gear rack being formed in the exposed side edge.

4. An idler wheel support according to claim 1 wherein the gear rack is carried by or on the base and faces the first end portion of the frame member.

5. An idler wheel support according to claim 1 wherein the gear coupler comprises an aperture comprising an upright aperture axis, the aperture pivotally receiving the gear such that the gear pivots about the aperture axis in the respective first and second gear pivot directions.

6. An idler wheel support according to claim 1 wherein the first foot has a first foot first end portion extending in one direction away from the body and a first foot second end portion extending in another direction opposite to said one direction and away from the body and away from the first foot first end portion, the first foot first end portion comprises a first bolt receiving slot and the first foot second end portion comprises a second bolt receiving slot, the first and second bolt receiving slots extending in opposite directions away from the frame member for receiving respective bolts that hold the first foot in position on the conveyor frame but permit the sliding movement of the first foot relative to the conveyor frame in response to pivoting the gear in engagement with the gear rack in the respective first and second gear pivot directions.

7. An idler wheel support according to claim 6 wherein the base comprises first and second base end portions with a base bolt receiving aperture through the first base end portion that is aligned with one of the first and second bolt receiving slots, the base bolt receiving aperture being sized such that a bolt inserted through the aligned first or second bolt receiving slot and the base bolt receiving aperture couples the base to the conveyor frame, the base bolt receiving aperture being sized to prevent sliding movement of the base relative to the conveyor frame, and wherein the second base end portion comprises a base slot aligned with another of the first and second bolt receiving slots other than said one of the bolt receiving slots, the base slot and said another of the first and second bolt receiving slots permitting sliding of the first foot relative to the base in response to pivoting the gear in engagement with the gear rack in the respective first and second directions.

8. An idler wheel support according to claim 6 wherein the second foot has a second foot first end portion extending in one direction away from the body and a second foot second end portion extending in another direction opposite to said one direction and away from the body and away from the second foot first end portion, the second foot first end portion comprises a third bolt receiving slot and the second foot second end portion comprises a fourth bolt receiving slot, the third and fourth bolt receiving slots extending in opposite directions away from the body for receiving respective bolts that hold the second foot in position on the conveyor frame, the width of the third and fourth slots being greater than the diameter of the bolts to be received therein to provide clearance between such bolts and the slots and to permit the pivoting movement of the second foot relative to the conveyor frame and to thereby allow changes in the angle of the frame member longitudinal axis relative to the conveyor belt longitudinal axis when the first foot and the second foot are coupled to the conveyor frame and in response to pivoting the gear in engagement with the gear rack in the respective first and second gear pivot directions.

9. An idler wheel support according to claim 6 wherein the first and second bolt receiving slots have a length that permits sliding of the first foot at least a total of at least two and one-half inches in response to pivoting the gear in the first and second gear pivot directions.

10. An idler wheel support according to claim 9 wherein the plate comprises a second side edge opposite to the exposed side edge and wherein the base comprises at least one upright flange abutting the second side edge and positioned to guide the sliding movement of the plate and thereby guide the sliding movement of the first foot.

11. An idler wheel support for coupling to the frame of a conveyor belt for supporting idler wheels that carry a conveyor belt, the idler wheel support comprising:
a frame member having a body with first and second frame end portions;
a plurality of idler wheel supports projecting from the frame member;
a first foot coupled to the first frame end portion for coupling to the conveyor frame at a first side of the conveyor belt;
a second foot coupled to the second frame end portion for pivotal coupling to the conveyor frame of a second side of the conveyor belt opposite to the first side of the conveyor belt;

a base for positioning beneath the first foot;

the first foot being slidable in respective opposed first and second directions relative to the base, and wherein the first frame end portion moves with the sliding movement of the first foot;

one of the first foot and the base comprising a gear rack, the other of the first foot and the base other than said one of the first foot and the base comprising a gear coupler positioned adjacent to the gear rack; and wherein with the first and second feet coupled to the conveyor frame and upon positioning a gear in the gear coupler and in engagement with the gear rack, pivoting the gear relative to the gear coupler in a first gear pivot direction with the gear engaged in the gear rack slides the first foot and first end portion of the frame member relative to the base in the first direction and pivots the second foot and second end portion of the frame member in the first direction, and wherein pivoting the gear relative to the gear coupler in a second gear pivot direction opposite to the first gear pivot direction with the gear engaged with the gear rack slides the first foot and first end portion of the frame member in the second direction and pivots the second end portion of the frame member in the second direction.

12. An idler wheel support according to claim 11 wherein the gear rack is on the first foot.

13. An idler wheel support according to claim 12 wherein the first foot comprises a plate with an exposed side edge, the gear rack being formed in the exposed side edge.

14. An idler wheel support according to claim 13 wherein the plate comprises a second side edge opposite to the exposed side edge and wherein the base comprises at least one upright flange abutting the second side edge.

15. An idler wheel support according to claim 11 wherein the gear rack is on the base and faces the first end portion of the frame member.

16. An idler wheel support according to claim 11 wherein the gear coupler comprises an aperture comprising an upright aperture axis, the aperture being positioned relative to the gear rack such that the aperture pivotally receives the gear with the gear engaged with the gear rack, and wherein the gear is pivotal about the aperture axis in the respective first and second gear pivot directions.

17. An idler wheel support according to claim 11 wherein the first foot has a first foot first end portion extending in one direction away from the body and a first foot second end portion extending in another direction opposite to said one direction and away from the body and away from the first foot first end portion, the first foot first end portion comprises a first bolt receiving slot and the first foot second end portion comprises a second bolt receiving slot, the first and second bolt receiving slots extending in opposite directions away from body for receiving respective bolts that hold the first foot in position on the conveyor frame but permit the sliding movement of the first foot relative to base in the first and second directions; and wherein the base comprises first and second base end portions with a base bolt receiving aperture through the first base end portion that is aligned with one of the first and second bolt receiving slots, the base bolt receiving aperture being sized such that a bolt inserted through the aligned first or second bolt receiving slot and the base bolt receiving aperture couples the base to the conveyor frame, the base bolt receiving aperture being sized to prevent sliding movement of the base relative to the conveyor frame, and wherein the second base end portion comprises a base slot aligned with another of the first and second bolt receiving slots other than said one of the bolt receiving slots, the base slot and said another of the first and second fastener receiving slots permitting sliding of the first foot relative to the base in response to pivoting the gear in engagement with the gear rack in the respective first and second directions.

18. An idler wheel support according to claim 17 wherein the second foot has a second foot first end portion extending in one direction away from the body and a second foot second end portion extending in another direction opposite to said one direction and away from the body and away from the second foot first end portion, the second foot first end portion comprises a third bolt receiving slot and the second foot second end portion comprises a fourth bolt receiving slot, the third and fourth bolt receiving slots extending in opposite directions away from the body for receiving respective bolts that hold the second foot in position on the conveyor frame, the width of the third and fourth slots being greater than the diameter of the bolts to be received therein to provide clearance between such bolts and the slots and to permit the pivoting movement of the second foot relative to the conveyor frame and to thereby allow changes in the angle of the frame member longitudinal axis relative to the conveyor frame longitudinal axis when the first foot and the second foot are coupled to the conveyor frame and in response to pivoting the gear in engagement with the gear rack in the respective first and second gear pivot directions.

19. An idler wheel support for supporting idler wheels that carry a conveyor belt, the idler wheel support comprising:
a frame member having a body with first and second frame end portions;
a plurality of idler wheel supports projecting from the frame member;
a first foot coupled to the first frame end portion;
a second foot coupled to the second frame end portion;
a base for positioning beneath the first foot;
the first foot being slidable in respective opposed first and second directions relative to the base and the first end portion of the frame member sliding relative to the base with the sliding movement of the first foot;
one of the first foot and the base comprising a gear rack, the other of the first foot and the base other than said one of the first foot and the base comprising a gear coupler positioned adjacent to the gear rack; and
wherein the gear coupler comprises an aperture comprising an upright aperture axis, the aperture being positioned relative to the gear rack such that the aperture pivotally receives a gear with the gear engaged with the gear rack, and wherein pivoting the received gear about the aperture axis in the respective first and second gear pivot directions with the received gear in engagement with the gear rack operates to slide the first foot in the respective first and second directions.

20. An idler wheel support according to claim 19 wherein the first foot has a first foot first end portion extending in one direction away from the body and a first foot second end portion extending in another direction opposite to said one direction and away from the body and away from the first foot first end portion, the first foot first end portion comprises a first bolt receiving slot and the first foot second end portion comprises a second bolt receiving slot, the first and second bolt receiving slots extending in opposite directions away from the body for receiving respective bolts that hold the first foot in position on the conveyor frame but permit the sliding movement of the first foot relative to the base in the first and second directions;

wherein the base comprises first and second base end portions with a base bolt receiving aperture through the first base end portion that is aligned with one of the first and second bolt receiving slots, the base bolt receiving aperture being sized such that a bolt inserted through the aligned first or second bolt receiving slot and the base bolt receiving aperture couples the base to the conveyor frame, the base bolt receiving aperture being sized to prevent sliding movement of the base relative to the conveyor frame when a bolt is inserted therethrough, and wherein the second base end portion comprises a base slot aligned with another of the first and second bolt receiving slots other than said one of the bolt receiving slots, the base slot and said another of the first and second fastener receiving slots permitting sliding of the first foot relative to the base in response to pivoting the gear in engagement with the gear rack in the respective first and second directions; and wherein the second foot has a second foot first end portion extending in one direction away from the body and a second foot second end portion extending in another direction opposite to said one direction and away from the body and away from the second foot first end portion, the second foot first end portion comprises a third bolt receiving slot and the second foot second end portion comprises a fourth bolt receiving slot, the third and fourth bolt receiving slots extending in opposite directions away from the body for receiving respective bolts that hold the second foot in position on the conveyor frame, the width of the third and fourth slots being greater than the diameter of the bolts to be received therein to provide clearance between such bolts and the slots to permit the pivoting movement of the second foot relative to the conveyor frame and to thereby allow changes in the angle of the frame member longitudinal axis relative to the conveyor frame longitudinal axis when the first foot and the second foot are coupled to the conveyor frame and in response to pivoting the gear in engagement with the gear rack in the respective first and second gear pivot directions.

21. An idler wheel support according to claim 20 wherein the gear rack is on the first foot and wherein the first foot comprises a plate with an exposed side edge, the gear rack being formed in the exposed side edge, and wherein the plate comprises a second side edge opposite to the exposed side edge and wherein the base comprises at least one upright flange abutting the second side edge.

22. An idler wheel support according to claim 20 wherein the gear rack is on the base and faces the first end portion of the frame member.

23. An idler wheel support according to claim 19 wherein the gear rack is on the first foot and wherein the first foot comprises a plate with an exposed side edge, the gear rack being formed in the exposed side edge, and wherein the plate comprises a second side edge opposite to the exposed side edge and wherein the base comprises at least one upright flange abutting the second side edge.

24. An idler wheel support according to claim 19 wherein the gear rack is on the base and faces the first end portion of the frame member.

25. An idler wheel support according to claim 19 in combination with a gear comprising a gear projection sized for insertion into the aperture for pivoting the gear about the aperture axis, the gear being sized to engage the gear rack with the gear projection inserted into the aperture, a lever projecting outwardly in a direction perpendicular to the upright aperture axis when the gear projection is inserted into the aperture, and wherein pivoting the lever about the aperture axis pivots the gear and slides the first foot and first end portion of the frame member relative to the base.

26. An idler wheel support in combination with a conveyor frame comprising:
a conveyor frame having a conveyor frame longitudinal axis and for supporting idler wheels that carry a conveyor belt, the conveyor belt having first and second sides and a conveyor belt longitudinal axis oriented in the direction of movement of the conveyor belt;
the idler wheel support comprising being coupled to the conveyor frame;
the idler wheel support comprising:
a frame member comprising a body with first and second end portions, the frame member having a frame member longitudinal axis that is oriented transverse to the longitudinal axis of the conveyor belt when the idler wheel support is in a position to support the conveyor belt on the idler wheels;
idler wheel support brackets projecting upwardly from the frame member in a position to mount idler wheels that carry the conveyor belt;
a first foot coupled to the first end portion of the frame member for coupling the first end portion of the frame member to the conveyor frame at the first side of the conveyor belt;
a second foot coupled to the second end portion of the frame member for coupling the second end portion of the frame member to the conveyor frame at a second side of the conveyor belt, the second foot being coupled to the conveyor frame so as to pivot relative to the conveyor frame to allow changes in the angle of the frame member longitudinal axis relative to the conveyor frame longitudinal axis when the first foot and the second foot are coupled to the conveyor frame;
a base for coupling to the conveyor frame;
the first foot being slidably coupled to the base, wherein sliding movement of the first foot relative to the base changes the angle of the frame member longitudinal axis relative to the conveyor frame longitudinal axis;
one of the first foot and the base comprising a gear rack, the other of the first foot and the base other than said one of the first foot and the base comprising a gear coupler positioned adjacent to the gear rack; and
wherein positioning a gear in the gear coupler and in engagement with the gear rack and pivoting the gear relative to the gear coupler in a first gear pivot direction slides the first foot and first end portion of the frame member in a first direction and pivots the second end portion of the frame member in the first direction, and wherein pivoting the gear relative to the gear coupler in a second gear pivot direction opposite to the first gear pivot direction slides the first foot and first end portion of the frame member in a second direction opposite to the first direction and pivots the second end portion of the frame member in the second direction, whereby sliding the first end portion adjusts the frame member longitudinal axis relative to the conveyor frame longitudinal axis and adjusts the longitudinal tracking of the conveyor belt; and
the base being mounted to the conveyor frame at the first side of the conveyor belt, the second foot being pivotally coupled to the conveyor frame at the second side of the conveyor belt, wherein sliding of the first foot relative to the base slides the first foot and first end portion of the frame member relative to the conveyor frame pivots the second foot and second end portion of the frame member relative to the conveyor frame.

27. An idler wheel support according to claim 26 in combination with a conveyor frame further comprising a gear positioned in the gear coupler and engagement with the gear rack.

28. An idler wheel support according to claim 27 in combination with a conveyor frame further comprising a lever extending outwardly from the gear when the gear is coupled to the gear coupler and in engagement with the gear rack.

29. An idler wheel support according to claim 28 in combination with a conveyor frame wherein the base is bolted to the conveyor frame so that the base does not move relative to the conveyor frame in the direction of the conveyor frame longitudinal axis while bolted thereto.

30. An idler wheel support according to claim 26 comprising a plurality of idler wheels carried by the idler wheel supports.

\* \* \* \* \*